April 17, 1928.
F. W. NITTEL
WATCH BRACELET END HOOK
Filed Aug. 18, 1927
1,666,864
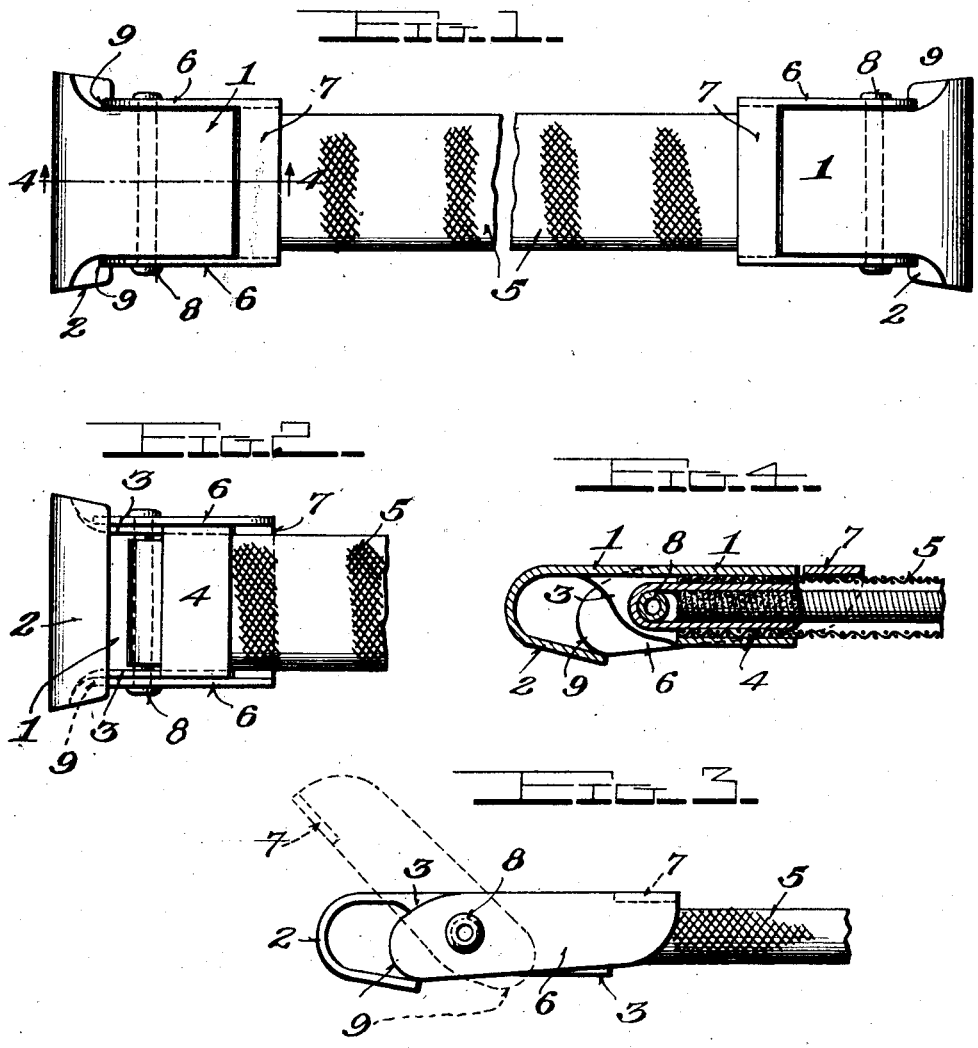

Patented Apr. 17, 1928.

1,666,864

UNITED STATES PATENT OFFICE.

FREDERICK W. NITTEL, OF ATTLEBORO FALLS, MASSACHUSETTS, ASSIGNOR TO M S CO., OF ATTLEBORO, MASSACHUSETTS.

WATCH-BRACELET END HOOK.

Application filed August 18, 1927. Serial No. 213,823.

This invention relates to certain new and useful improvements in watch bracelet end hooks, and the primary object thereof is to provide an improved form of keeper or latch for holding the end hook engaged with the usual bail or bar on the side of the watch.

A further object of the invention is to provide a keeper or latch in which the latter is held in position by the tension of the resilient nose of the hook.

Still further the invention aims to provide a keeper which is positively and effectively held in position and which at the same time can be easily and quickly manipulated to either operative or inoperative position, and more specifically, to provide a keeper which cams against the nose of the hook.

Further and other objects will be later set forth and manifested.

In the drawings:—

Figure 1 is a top plan view of the invention;

Figure 2 is a bottom plan view of one of the hooks;

Figure 3 is a side elevation of one end of Figure 1 and

Figure 4 is a section on line 4—4 of Fig. 1.

In proceeding in accordance with the present invention the hook member is composed of a top 1 having an extension at its front, which latter is bent to form a hook 2. The hook member is formed of resilient material and consequently the free end of the hook 2 is resilient. The hook member is further provided with sides 3 which depend from its top. The sides 3 are connected by a cross bar 4, which in conjunction with the sides 3, provides a hollow shank in which is received and fixedly secured, as by soldering, one end of the bracelet 5. The bracelet 5 may be of any form and forms no part of the present invention.

The keeper or latch is of generally U-shape and has sides 6 which latter are connected at their rear ends by a cross bar 7, the cross bar engaging on top of the bracelet 5 as shown in Figure 4, thereby affording a stop to limit movement of the keeper or latch to operative position due to the bracelet 5 being fixedly secured to and in the hollow shank provided by the sides 3 and cross bar 4 as above noted. The sides 6 of the keeper or latch engage over the sides 3 of the hook member and are pivoted thereto by means of a pivot pin 8, to which latter the bracelet 5 is connected as shown. The front free end edges of the sides 6 of the keeper or latch are of cam-shape, and, as shown in Figures 3 and 4, are adapted to wipingly engage the free end or nose of the hook 2 so that the latter exerts upward pressure on the cam 9 thereby to hold the cross bar 7 engaged with the bracelet. In this way, it will be seen that the keeper or latch can be easily and quickly operated and is reliably and effectively held in position under tension.

It will further be seen that the entire device is composed of but three parts, which may be easily and quickly produced and assembled, and that a positive friction lock for the keeper is provided at each of the sides thereof.

Having thus described my invention what I claim as new and desire to secure by Letters Patent is:—

1. In a watch bracelet fastener, a member having a top formed with a front extension bent to form a resilient hook, extensions on the side of the member at the rear thereof bent toward the hook to form sides and then bent inwardly towards each other and secured together to form a hollow shank for receiving an end of a bracelet therein, and a keeper having sides mounted over and pivoted to the sides of the shank and having a cross bar connected to the rear ends of the keeper sides and engageable with the rear of the top of the member, said sides of the keeper at the fronts thereof being of cam-shape and formed to wipingly engage the hook whereby the latter holds the keeper under tension in closed position.

2. In a watch bracelet fastener, a member having a watch bracelet end hook, stop means carried by the member, and a keeper pivoted to the member and having a part to engage the stop means in operative position thereof, said keeper having sides each formed with a cam-shaped part to wipingly engage the hook and said hook being resilient so as to hold the keeper in operative position under tension by engagement with said cam shaped parts.

3. In a watch bracelet fastener, a member having a watch bracelet end hook, stop means carried by the member, and a keeper pivoted to the member and having a part to engage the stop means in operative position thereof, said keeper having a cam formed to wipingly engage the hook, and said hook being resilient so as to hold the keeper in operative position by engagement with said cam.

4. In a watch bracelet fastener, a member having a watch bracelet end hook, stop means carried by the member, and a keeper pivoted to the member and having a part to engage the stop means in operative position thereof, said keeper having means formed to move into and out of engagement with the hook, and said hook being resilient whereby to exert tension on said last named means to hold same in operative position and to yield and enable the keeper to be moved to inoperative position out of engagement with the hook.

In testimony whereof I have signed my name to this specification.

FREDERICK W. NITTEL.